United States Patent [19]

Blackburn et al.

[11] Patent Number: 5,821,291

[45] Date of Patent: Oct. 13, 1998

[54] STICK FOR FILLING, MASKING AND SEALING SCRATCHES IN A PAINTED SUBSTRATE

[75] Inventors: Thomas Vincent Blackburn, Lancashire; Roy Taylor, Cheshire, both of England

[73] Assignee: Turtle Wax, Inc., Chicago, Ill.

[21] Appl. No.: 829,908

[22] Filed: Mar. 26, 1997

[51] Int. Cl.[6] .............................. C08L 91/06; C08K 5/01; B43K 29/02

[52] U.S. Cl. .......................... 524/277; 524/275; 524/487; 524/763; 401/61

[58] Field of Search .................................... 524/275, 277, 524/487, 463; 401/61

[56] References Cited

U.S. PATENT DOCUMENTS

| | | | |
|---|---|---|---|
| 3,787,345 | 1/1974 | Dickman et al. | 524/322 |
| 3,787,646 | 1/1974 | Dickmann et al. | 524/157 |
| 3,873,475 | 3/1975 | Pechacek et al. | 523/509 |
| 3,933,708 | 1/1976 | Brinkman | 523/164 |
| 4,372,991 | 2/1983 | Kendall | 427/140 |
| 4,814,200 | 3/1989 | Propst | 427/142 |
| 5,202,162 | 4/1993 | Hart, Jr. et al. | 427/282 |
| 5,529,841 | 6/1996 | Neihof | 428/328 |

FOREIGN PATENT DOCUMENTS

| WO 96/077064A3 | 3/1996 | WIPO . |
|---|---|---|
| WO 96/07706A2 | 3/1996 | WIPO . |

Primary Examiner—Kriellion S. Morgan
Attorney, Agent, or Firm—Baker & McKenzie

[57] ABSTRACT

A stick for the application of a colored composition to scratches, nicks or chips in a painted substrate, such as a vehicle body, is provided. The stick fills in, masks and seals the scratches, nicks or chips producing a finish that has a final appearance substantially similar to the surrounding vehicle finish and maintains water and rust repellency over repeated washings and exposure to the elements. The stick includes a structuring substance containing one or more waxes, a pigment, and a wax soluble liquid silicone polymeric material. In one preferred embodiment of the invention, the stick comprises an acid wax derived from montan wax, a paraffin wax, carnauba wax, pigment and a wax soluble liquid silicone polymeric material including polydimethyl siloxane and hydrocarbon groups. In another embodiment of the invention, the stick is conveniently mounted in an applicator of the lipstick holder type. In a further embodiment of the invention, a method for filling in, masking and sealing the scratches, nicks or chips in a painted substrate using the stick of the present invention is provided.

18 Claims, No Drawings

STICK FOR FILLING, MASKING AND SEALING SCRATCHES IN A PAINTED SUBSTRATE

BACKGROUND OF THE INVENTION

1. Field Of The Invention

This invention relates to a method and composition for filling and masking scratches, nicks, and chips in painted substrates. More particularly, the invention relates to a method and a stick for the application of a colored composition to scratches, nicks or chips in a vehicle finish or other painted substrate to fill in, mask and seal the scratches, nicks or chips.

2. Description of the Related Art

Even with the continuous advances in painting and surface treatment technology, painted substrates are still susceptible to scratching, nicking, or chipping when contacted with a sharp object. Particularly troublesome are the small scratches, nicks and chips that occur in the finish of vehicles when debris, such as stones and rocks, contacts the vehicle when traveling at moderate to high speeds. Often, the deepest scratches and chips can penetrate down to the bare metal, creating the conditions for corrosion and eventual metal perforation.

Other painted substrates suffer damage through use in the form of chips, scratches and the like; these substrates include outdoor furniture, appliances and others.

The ideal solution to the problem of scratches and chips that can lead to premature rusting in vehicles is to have the vehicle finish repaired by a professional at an auto body repair shop. However, the cost of repairs at these repair shops can be quite high and often vehicle owners cannot live with the inconvenience of being without a vehicle for a period of time while the repairs are being made. Therefore, vehicle owners often repair minor scratches and chips in their finish with repair products that are currently available on the market.

Products for filling in scratches and chips in a vehicle finish have long been available. Generally, such filler products are applied with a spatula, plastic blade or similar tool in a paste-like consistency. The filler is then allowed to dry and is sanded smooth before painting. U.S. Pat. No. 3,873,475 discloses such a composition for filling and patching dents in automobile bodies. While these type of scratch filling products assist in the production of a smooth repaired painted surface, many vehicle owners may avoid use of these products as the average vehicle owner may find the multi-step process, which requires filler application tools, sanding supplies, and paint supplies, to be complicated and quite time consuming.

Alternative methods and compositions for easier application of scratch filling products have also long been known. For instance, U.S. Pat. No. 4,372,991 discloses a combination scratch filler and primer that is dispensed in an aerosol dispensing system. This system avoids the use of filler application tools such as spatulas and blades so it does provide advantages over other scratch filling compositions and methods. However, the composition disclosed in this patent still must be sanded to a glossy surface after drying, and painted. Therefore, vehicle owners may shy away from use of this type of product to repair scratch damage as the filler product still requires subsequent sanding and painting.

Clearly, the average vehicle owner demands a product that can both fill in, mask and seal scratches, nicks and chips in a vehicle finish and does not require a multi step repair process wherein a product must be applied, sanded and painted over.

Car finish repair products have been proposed wherein scratches or nicks can be covered with a colored composition in a one step process. For example, German Patent DE 4431897-C2 (also published as PCT WO9607706-A3) discloses a method for covering scratches caused by stone chips in the paintwork of cars, wherein the damage in the paintwork is covered in wax crayon of similar color to the paintwork itself. The disclosure states that it is possible to cover the scratches with the conventional wax crayons available for use by artists and school children. The patent states that the wax is applied to the damaged paintwork surface simply by crayoning it on cold, moving the crayon vertically to the scratch and applying wax until the scratch is at least filled and level with the surface of the paintwork. The description states that the wax crayons used in the invention generally comprise a matrix of a natural or synthetic wax and a fat-soluble organic pigment.

While the method for covering scratches in a car finish disclosed in German Patent DE 4431897-C2 may be suitable in some car repair applications, it has limitations. For example, wax based compositions do provide water repellency; however, they often require additional ingredients in order to achieve the durability required of a finish that will be subjected to the harsh weathering conditions associated with sunlight, rain, sleet, snow, road salt, road soils and ice. Generally, car finish restoration products are specially designed and formulated so as to form and maintain a water and rust repellent seal when applied to auto bodywork. It is believed that finishing products containing only pigment and a wax binder may not provide the finish durability consumers demand in a finish restoration product.

Therefore, there exists a need to provide an improved method and composition for filling, masking, and sealing scratches, nicks, and chips in painted substrates, such as vehicle bodies. The improved method and composition should be able to be used by the average vehicle owner to repair scratches, nicks and chips, without resorting to using the services of a vehicle repair professional. Furthermore, the composition must be specially formulated and designed so that it easily fills in a scratch, masks the scratch so that the filler material has a final appearance substantially similar to the surrounding car finish, and maintains a water and rust repellent seal over repeated washings and exposure to the elements.

Accordingly, it is an object of this invention to provide an improved method and composition for filling, masking, and sealing scratches, nicks, and chips in painted substrates, such as vehicle bodies, that may be used quickly, easily and effectively.

It is an additional object of this invention to provide an improved method and composition for filling, masking, and sealing scratches, nicks, and chips in painted substrates, such as vehicle bodies, that is specially formulated and designed so that it easily fills in a scratch and masks the scratch so that the filler material has a final appearance substantially similar to the surrounding finish.

It is a further object of this invention to provide an improved method and composition for filling, masking, and sealing scratches, nicks, and chips in painted substrates, such as vehicle bodies, that easily fills in a scratch and provides a durable finish which maintains a water and rust repellent seal over repeated washings and exposure to the elements.

SUMMARY OF THE INVENTION

The present invention satisfies the need for an improved method and composition for filling, masking, and sealing scratches, nicks, and chips in painted substrates, such as vehicle bodies, by providing a stick for the application of a colored composition to scratches, nicks or chips in the painted substrate to fill in, mask and seal the scratches, nicks or chips. The stick includes: a structuring substance containing one or more waxes, a pigment, and a liquid silicone polymeric material.

It has been discovered that the use of a combination of waxes and a liquid silicone polymeric material, which has been modified with functional groups to make the liquid material soluble in waxes, provides for an improved filling, masking, and sealing composition that easily fills in a scratch and maintains a water and rust repellent seal over repeated washings and exposure to the elements. Most standard high viscosity silicone containing materials are not soluble in waxes. These high viscosity silicone containing materials can be dispersed in a wax matrix; however, they tend to bleed out when pressure is exerted on the wax matrix and can also be seen as droplets when the wax mixture is broken. Therefore, most silicone containing materials have been unsuitable for incorporation into wax based compositions.

In the present invention, the incorporation of a wax soluble liquid silicone polymeric material into a wax structuring substance that holds a pigment provides for a filling, masking and sealing composition that easily fills in a scratch in a painted substrate and maintains a water and rust repellent seal over repeated washings and exposure to the elements. The wax soluble liquid silicone polymeric material is advantageously used in the formulation of the present invention as it provides improved durability over finish restoration substances containing only a wax matrix. In addition, the liquid silicone polymeric material will not bleed out of the formulation.

In another embodiment of the invention, the stick for the application of a colored composition to scratches, nicks or chips in the painted substrate is conveniently mounted in an applicator of the lipstick holder type wherein the applicator has a rotating knob mounted on a container for dispensing the product in the form of a stick and a cap for closing the container.

In a further embodiment of the invention, a method for filling in, masking and sealing the scratches, nicks or chips in a painted substrate is provided. The method includes the steps of moving the stick over a scratch, nick or chip until the scratch, nick or chip is at least filled with the colored composition up to the surface of the painted substrate. Any excess colored composition above the surface of the painted substrate is then rubbed off and the surface of the painted substrate is buffed to a smooth finish.

These and other features, aspects, objects, and advantages of the present invention will be become better understood upon consideration of the following detailed description and appended claims.

DESCRIPTION OF THE PREFERRED EMBODIMENTS

The invention is illustrated by the following Example in which a formulation for filling, masking, and sealing scratches, nicks, and chips in painted substrates was prepared.

| CHEMICAL INGREDIENT | Weight Percent |
| --- | --- |
| "HOECHST WAX S" | 35.0 |
| Paraffin Wax 140 | 35.0 |
| Carnauba Wax | 5.0 |
| Ebony Pigment | 13.0 |
| Dow Corning 203 Silicone Fluid | 11.9 |
| Perfume | 0.1 |

The chemical ingredients used in the formulation above are all commercially available. "HOECHST WAX S" is the trademark for an acid wax derived from montan wax and is available from Hoechst Corporation. Paraffin Wax 140 is a standard paraffin wax having a melting point of 140° F. Dow Corning 203 Silicone Fluid is a liquid silicone polymeric material including polydimethylsiloxane modified with additional hydrocarbon groups.

The formulation was prepared by melting together the waxes and heating them to 110°–120° C. The melted waxes were then continuously mixed and the pigment was sprinkled in and the mixture was reheated to 100° C. Mixing was continued until all of the pigment was fully dispersed in the wax mixture. The silicone fluid and perfume were then slowly added while mixing the waxes. The mixture was continuously agitated for fifteen minutes while maintaining the temperature at 80°–85° C. The mixture was then allowed to cool to room temperature, yielding a solid composition.

The solid composition produced in the foregoing process can then be molded or extruded into a desired shaped form, usually a cylindrical stick that can be conveniently mounted in an applicator of the lipstick holder type wherein the applicator has a rotating knob mounted on a container for dispensing the product in the form of a stick and a cap for closing the container. This type of applicator/container has proven to be an efficient device for easily dispensing the stick.

In order to test the effectiveness of the composition of the present invention in filling scratches, nicks and other chips in a painted substrate, a stick produced by the process described in the Example was used in treating deep scratches in the surface of an automobile finish. This involved selecting a stick having a color matching the painted substrate and moving the stick over the scratch until the scratch was at least filled with the colored composition of the stick up to the surface of the painted auto body. Then any excess colored composition above the surface of the painted substrate was rubbed off using a cloth. The surface of the auto body was then buffed to a smooth gloss finish.

The auto was then subjected to repeated washings. This testing showed that the composition of the present invention would continue to fill, mask and seal scratches in the auto finish even after 40 wash cycles. The combination of the wax-based structuring substances, which provide water repellency to the composition, and the liquid silicone polymeric material, which imparts water repellency and durability to the composition, provided an effective water and rust repellent seal to the auto body. Further application of a supplemental auto polish has also been found to form a longer lasting seal to vehicle paintwork. In addition, the composition of the stick has been found suitable for application to many different paint finishes including metallic and painted fiberglass.

Thus, it is seen that an improved method and composition for filling, masking, and sealing scratches, nicks, and chips in painted substrates, such as vehicle bodies, is provided. The disclosed method and composition have advantages over prior art methods and compositions as the composition of the present invention is specially formulated and designed so that it easily fills in a scratch, masks the scratch so that the filler material has a final appearance substantially similar to the surrounding vehicle finish, and maintains a water and rust repellent seal over repeated washings and exposure to the elements. Particularly advantageous over the available vehicle finish restoration products is the increased durability provided by the formulation of the present invention.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A stick for the application of a colored composition to scratches, nicks or chips in a painted substrate to fill in, mask and seal the scratches, nicks or chips, the stick consisting essentially of:

a wax structuring substance;

a pigment; and a liquid silicone polymeric material.

2. The stick of claim 1 wherein the structuring substance includes a wax selected from the group consisting of acid waxes derived from montan wax, paraffin waxes and carnauba wax.

3. The stick of claim 2 wherein the structuring substance consists of an acid wax derived from montan wax, a paraffin wax and carnauba wax.

4. The stick of claim 3 wherein the structuring substance consists of 7 parts of the acid wax derived from montan wax, 7 parts of the paraffin wax and 1 part of the carnauba wax.

5. The stick of claim 1 wherein the liquid silicone polymeric material is wax soluble.

6. The stick of claim 5 wherein the liquid silicone polymeric material includes polydimethyl siloxane modified with additional hydrocarbon groups.

7. The stick of claim 3 wherein the liquid silicone polymeric material is wax soluble and includes polydimethyl siloxane modified with additional hydrocarbon groups, and wherein the stick comprises about 35% by weight of the acid wax derived from montan wax, about 35% by weight of the paraffin wax, about 5% by weight of the carnauba wax, about 13% by weight of the pigment and about 12% by weight of the liquid silicone polymeric material.

8. The stick of claim 1 wherein the painted substrate is a vehicle body.

9. In combination with an applicator having a rotating knob mounted on a container for dispensing a product in the form of a stick and a cap for closing the container, a stick for the application of a colored composition to scratches, nicks or chips in a painted substrate to fill in, mask and seal the scratches, nicks or chips, the stick consisting essentially of:

a wax structuring substance;

a pigment; and a liquid silicone polymeric material.

10. The stick of claim 9 wherein the structuring substance includes a wax selected from the group consisting of acid waxes derived from montan wax, paraffin waxes and carnauba wax.

11. The stick of claim 10 wherein the structuring substance consists of an acid wax derived from montan wax, a paraffin wax and carnauba wax.

12. The stick of claim 11 wherein the structuring substance consists of 7 parts of the acid wax derived from montan wax, 7 parts of the paraffin wax and 1 part of the carnauba wax.

13. The stick of claim 9 wherein the liquid silicone polymeric material is wax soluble.

14. The stick of claim 13 wherein the liquid silicone polymeric material includes polydimethyl siloxane modified with additional hydrocarbon groups.

15. The stick of claim 11 wherein the liquid silicone polymeric material is wax soluble and includes polydimethyl siloxane modified with additional hydrocarbon groups, and wherein the stick comprises about 35% by weight of the acid wax derived from montan wax, about 35% by weight of the paraffin wax, about 5% by weight of the carnauba wax, about 13% by weight of the pigment and about 12% by weight of the liquid silicone polymeric material.

16. The stick of claim 9 wherein the painted substrate is a vehicle body.

17. A method for filling in, masking and sealing the scratches, nicks or chips in a painted substrate having a surface, said method comprising:

moving the stick of claim 1 over the scratch, nick or chip until the scratch, nick or chip is at least filled with the colored composition up to the surface of the painted substrate;

rubbing off any excess colored composition above the surface of the painted substrate; and buffing the surface of the painted substrate to a smooth finish.

18. The method of claim 17 wherein the painted substrate is a vehicle body and the method further comprises applying a polish to the vehicle body after buffing the surface.

* * * * *